US011714808B2

(12) United States Patent
Peterson et al.

(10) Patent No.: US 11,714,808 B2
(45) Date of Patent: Aug. 1, 2023

(54) PATTERN SEARCH REQUEST EMBEDDED IN A TRANSPORT MODE COMMAND WORD FOR A CHANNEL SUBSYSTEM IN A STORAGE SYSTEM

(71) Applicant: International Business Machines Corporation, Armonk, NY (US)

(72) Inventors: Beth Ann Peterson, Tucson, AZ (US); Patricia G. Driever, Poughkeepsie, NY (US); Dale F. Riedy, Poughkeepsie, NY (US); John R. Paveza, Morgan Hill, CA (US); Roger G. Hathorn, Tucson, AZ (US); Wayne Erwin Rhoten, Morgan Hill, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 37 days.

(21) Appl. No.: 17/469,647

(22) Filed: Sep. 8, 2021

(65) Prior Publication Data
US 2023/0071356 A1    Mar. 9, 2023

(51) Int. Cl.
G06F 16/245    (2019.01)

(52) U.S. Cl.
CPC .................. *G06F 16/245* (2019.01)

(58) Field of Classification Search
CPC .... G06F 16/24; G06F 16/242; G06F 16/2433; G06F 16/2438; G06F 16/2448; G06F 16/245; G06F 13/12; G06F 13/124; G06F 13/126; G06F 3/0659
See application file for complete search history.

(56) References Cited

U.S. PATENT DOCUMENTS

| 5,461,721 A | 10/1995 | Cormier et al. |
| 7,818,472 B2 | 10/2010 | Kalos et al. |
| 7,818,473 B2 | 10/2010 | Candelaria et al. |

(Continued)

FOREIGN PATENT DOCUMENTS

EP    0240616 A1 * 10/1987    ......... G06F 13/1657

OTHER PUBLICATIONS

IBM, "zArchitecture Principles of Operation", dated Sep. 2019, Thirteenth Edition, Total 2000 pages.

(Continued)

*Primary Examiner* — James E Richardson
(74) *Attorney, Agent, or Firm* — Konrad Raynes Davda & Victor LLP; William K. Konrad

(57) ABSTRACT

Provided are a computer program product, system, and method for processing request directed through a channel subsystem to a storage server. In one embodiment, a pattern search request is embedded in a Device Command Word (DCW) which allows the storage server to do all or substantially all of the search and comparison work in response to as few as a single DCW from the host. In addition, I/O processing can be enhanced to use the target record of interest of a successful embedded pattern search request as the starting point for read/write I/O processing, all in response to as few as a single DCW. Still further, orientation rules can also be relaxed such that once a target record is found, any and all fields of the record can be accessed and utilized in execution of subsequent commands of the initial or subsequent DCWs of the chain.

25 Claims, 6 Drawing Sheets

(56) References Cited

U.S. PATENT DOCUMENTS

| | | | |
|---|---|---|---|
| 8,055,807 | B2 | 11/2011 | Casper et al. |
| 8,140,713 | B2 | 3/2012 | Casper et al. |
| 8,606,767 | B2 | 12/2013 | Brown et al. |
| 8,683,130 | B2 | 3/2014 | Benhase et al. |
| 9,141,477 | B2 | 9/2015 | Amann et al. |
| 9,921,770 | B1 | 3/2018 | Feeney et al. |
| 10,133,505 | B1 | 11/2018 | LeCrone et al. |
| 10,657,082 | B1 | 5/2020 | LeCrone et al. |
| 10,671,318 | B2 | 6/2020 | Berger et al. |
| 10,901,838 | B2 | 1/2021 | Wong et al. |
| 10,976,937 | B1 | 4/2021 | Quinn et al. |
| 2009/0210559 | A1 | 8/2009 | Flanagan et al. |
| 2010/0036977 | A1 | 2/2010 | Candelaria et al. |
| 2010/0036978 | A1* | 2/2010 | Candelaria ............ G06F 13/126 710/24 |
| 2013/0007303 | A1* | 1/2013 | Candelaria ............ G06F 13/42 710/6 |
| 2017/0329557 | A1* | 11/2017 | Berger .................. G06F 3/0673 |
| 2017/0329675 | A1* | 11/2017 | Berger ................ G06F 11/1435 |
| 2019/0243545 | A1 | 8/2019 | Trika et al. |
| 2019/0391925 | A1 | 12/2019 | Meiri et al. |
| 2021/0109678 | A1 | 4/2021 | La Fratta et al. |

OTHER PUBLICATIONS

Wikipedia, "Count Key Data" (online) retrieved from the Internet on Aug. 24, 2021 at URL https://en.wikipedia.org/wiki/Count_Key_data, Total 13 pages.

King et al.; "More Data, Less Chatter: Improving Performance On z/OS Via IBM zHPF", dated Aug. 14, 2015, Paper SAS1715-2015, Share In Orlando, Total 18 pages.

IBM "zVSE" (online) retrieved from the Internet on Aug. 24, 2021 at URL>https://www.ibm.com/docs/en/zvse/6.2 . . . Total 1 page.

Chambliss et al.; "An Architecure For Storage-Hosted Application Extensions", dated Jul./Sep. 2008, IBM Journal Of Research & Development, vol. 52, No. 4/5, pp. 427-437.

Riedy, Dale; "High Performance FICON Demystified Update And User Experience", dated Aug. 8, 2012, IBM Share In Anaheim, Total 52 pages.

Guendert, Steve; "Understanding High Performance FICON (zHPF)", dated Apr. 24, 2013, System z Solution & Technologies, Total 60 pages.

Wu et al.; "High Performance Sorting Algorithms On AIX", dated Feb. 6, 2008, IBM Research Report, Total 17 pages.

PCT International Search Report and Written Opinion dated Dec. 16, 2022, 7pp., for Serial No. PCTIB2022/058318, P202100907PCT01.

* cited by examiner

PATTERN SEARCH REQUEST EMBEDDED IN A TRANSPORT MODE COMMAND WORD FOR A CHANNEL SUBSYSTEM IN A STORAGE SYSTEM

BACKGROUND OF THE INVENTION

1. Field of the Invention

The present invention relates to a computer program product, system, and method for processing a pattern search request embedded in a transport mode command word for a channel subsystem.

2. Description of the Related Art

Input/output (I/O) operations are used to transfer data between memory and input/output devices of a processing environment. Specifically, data is written from memory to one or more input/output devices, and data is read from one or more input/output devices to memory by executing input/output operations.

To facilitate processing of input/output operations, an input/output subsystem of the processing environment is employed. The input/output subsystem is coupled to main memory and the input/output devices of the processing environment and directs the flow of information between memory and the input/output devices. One example of an input/output subsystem is a channel subsystem. The channel subsystem uses channel paths as communications media. Each channel path includes a channel coupled to a storage server (also known as a control unit or storage controller), the storage server being further coupled to one or more input/output devices to control those I/O devices.

The channel subsystem typically employs channel command words to transfer data between the input/output devices and memory. A channel command word (CCW) specifies the command to be executed, and for commands initiating certain I/O operations, it designates the memory area associated with the operation, the action to be taken whenever transfer to or from the area is completed, and other options. Thus, a known CCW contains a channel command, such as read, write, or control, along with the data address of the data area involved. The data is passed to the channel subsystem. The channel subsystem communicates status of the I/O back to the issuing application.

During input/output processing, a list of channel command words is fetched from memory by a channel. The channel parses each command from the list of channel command words and forwards a number of the commands to a processor of a storage server coupled to the channel. The storage server then processes the commands. The channel tracks the state of each command and controls when the next set of commands is to be sent to the storage server for processing.

Processing environments incorporating CCWs have traditionally used unique protocols to transport the CCWs to a storage server. In a typical Fibre Connection (FICON) command mode channel program directed to a data format such as Count Key Data (CKD), one of a set of search commands are used to locate or orient to a specific record area on the track before executing a separately transferred read or write command. For example, locate record operations such as Define Extent (DX) and Locate Record (LR) commands are commonly used in connection with the Extended Count Key Data (ECKD) architecture for CKD formatted data.

A known Fibre Connection ("FICON") (Command Mode) write chain includes a number of CCWs which would allow the host server to transfer data to the attached storage system. As noted above, each CCW contains a command to be executed and either points to control parameters, or points to storage areas containing the data to be read or written. A CCW may point directly to the storage areas or may use some format of indirect addressing (Indirect Address List (IDAL) or a Modified Indirect Address List (MIDAL)) to point to the storage areas.

A standard FICON write chain may include Define Extent, Locate Record (Extended), and Write Commands. The Define Extent and Locate Record (Extended) may be collapsed into a Prefix Command. The Locate Record parameters describe a domain of operations that will immediately follow in the chain. These parameters define the read or write domain type, the starting address for the data transfer, as well as the expected number of data transfer commands in the chain. The chain may also include additional Locate Record (Extended) commands after the initial domain of write commands have been completed. These additional Locate Record (Extended) commands are called Embedded Locate Record commands and allow for additional domains to be defined in the chain. These domains may be contiguous or discontiguous.

In count-key-data (CKD) disk data format, a data field stores the user data. However because data records can be variable in length, each data record also has an associated count field that provides a record identifier (Record ID). By convention, this Record ID is often used to specify the track address. There is also defined an optional key field, that contains additional information such as a string of characters which may be used to identify a record (for example a filename). In addition to identifying the record, the count field provides the number of bytes in the optional key field and the optional user data area. Both the Record ID and Key fields enable a hardware search to be done on a specific value. In a command mode channel program compatible with CKD protocol, the storage server transfers a search argument from the channel, reads a count or key record area from the storage device or cache and performs a logical compare operation of the argument and read area to locate the target record.

CKD search commands typically start from a particular track (as defined by a command earlier in the chain) but then look at a particular field on each record and compares it to information, typically a search argument provided by the host through the channel as noted above. The host may request a search on a count field (ID) or key field. The host may request that the field and the argument match or that the field has a greater value than the argument, for example. The status returned by the storage server to the host indicates success or failure of the storage server to find the record that satisfies the requested compare. The host may opt to continue looking if there is not a match or may stop depending on the goals of the host program. For example, there may be record by record checking for multiple tracks, encountering significant command signal handshaking overhead transferring back and forth across the link, before a match is found. Once a match is found, the host may issue a write command to initiate writing of data at the data field of the successful search target, or may issue a read command to initiate a data read from the data field of the successful search target.

In known command mode channel programs compatible with the CKD protocol, this processing can be very inefficient but it is based on architecture from the 1960s and the limitations associated with spinning disk type storage devices. The original CKD architecture was based on reading records from a spinning disk and comparing the key field with the argument passed by the host. As the disk logically rotates, the storage server, in effect, is reporting to the host "This is your record" or "This is not your record". The channel program, which is not visible to the storage server, determines what is done with the result of this test of one record. The most common result was to branch back and test again for the pattern by sending another search command again for the next record. This chatter of handshaking signals across the channel takes time and can impede other data transfers.

Over time there have been advances in architectures directed to CKD formatted data. For example, in one known command mode channel program directed to a data format such as Count Key Data (CKD), there is a mechanism for FICON search commands which can indicate 'special search key mode' where the storage server may search all the records on a particular track.

An additional limitation of current command mode ECKD architecture related to its spinning disk origins is that once an operation is performed on one field of a record (such as the Key field), the disk orientation is assumed to be at the subsequent field. For example, if a search was performed on a Key field, the orientation is presumed to be pointing to the Data field of that record. As a result, command mode channel search programs were written in such a manner that they saved information about fields in each record operated on (such as the Count field) in anticipation of a successful search operation on a subsequent (e.g. Key) field. Following the rules established for spinning disks, once the search for a Key was successful, a backup operation typically was not available to read the Count field. As a result, the Count field of a record was usually read and saved prior to determining whether the key of that record matched the desired value (e.g. search argument). If the key matched the argument, the saved Count field could be used to read/write the data; if it didn't match, the saved Count field was typically discarded.

High Performance FICON (HPF), a more recent improvement to the I/O architecture, features Fibre Channel Protocol (FCP) for transmitting device command words (DCWs) to a storage server. DCWs may be employed in a channel command word descriptor (CCWD) denoting multiple commands to be executed by the storage server. The commands are executed independent of the channel, in that status relative to execution of the individual commands is not tracked by the channel (or the host). The storage server receives the multiple commands as a single information unit (IU) and has the responsibility of executing the commands in an appropriate manner. By relieving the channel of the responsibility of tracking individual commands, the performance of the channel is significantly enhanced. For example, overhead associated with handshaking signals between the channel (or host) and the storage server can be significantly reduced.

In general, the number of commands that may be encapsulated in an IU for DCW-type processing is limited because the transport layer in DCW type processing is limited in size. In one known system, for example, the layer allows for approximately 240 bytes of DCW data to be transmitted to the storage server in an IU. In this example, 80 bytes of the 240 bytes are reserved for DCW prefix parameters.

As noted above, in a typical Fibre Connection (FICON) command mode channel program, one of a set of search commands are used to locate or orient the storage device to a specific record area on the track before executing a read or write command. A limited set of locate record operations such as Define Extent and Locate Record commands are also commonly used in conjunction with read and write system commands of a transport mode channel program directed to DCWs. Thus, a write system command may be chained to Define Extent and Locate Record commands. In this manner, when a single record is written to an I/O device, a DCW chain, for example, is created and sent to the storage server controlling the target I/O device. The DCW chain includes a number of DCWs, such as Define Extent, Locate Record, and Write (and/or Read) commands chained together in this order. The Define Extent and Locate Record commands which precede the Read and Write system commands are referred to as prefix commands. The prefix commands are followed by the prefix parameters described previously.

A FICON protocol referred to as the z High Performance FICON (zHPF) protocol, has a command set for use in transport mode channel subsystems. The known zHPF command set exhibits standard FICON architecture behavior in that known Define Extent/Locate Record Extended (DX/LRE) parameters may be included in initial Prefix (PFX) commands of a DCW. The LRE parameters indicate which track, record, and or field are used for the initial orientation of an I/O operation in the FICON architecture. However, I/O operations performed on data sets that are defined with physical keys are not eligible for known zHPF systems. Thus, commands embedded in a DCW do not permit a pattern search. Instead, the host provides the starting record or track identification used for read or write operations of a DCW.

A known zHPF Channel Program includes a Transport Control Area (TCA) containing commands and control parameters. Each command is represented by a Device Command Word (DCW) that includes a command code, flags to indicate chaining and other options, a control data count, and a data byte count, if the command is used to transfer data. If the command transfers control data (command parameters) to the device, the control data follows the DCW in the TCA. The command code used is the same as those used in a Channel Command Word (CCW).

Unlike CCWs, DCWs do not point to their corresponding I/O buffers. The I/O buffers for all DCWs are pointed to by the TCA, and the I/O buffers associated with a particular DCW are based on the amount of data transferred by the previous DCWs.

A System Z High Performance FICON ("zHPF") (Transport Mode) write chain compresses control data used to describe the transfer operations performed by the chain. A write DCW will specify a PFX command with an Embedded CCW opcode and Intent Count. The Embedded CCW opcode would be equivalent to the Write Command Codes that are used for the Write CCWs that follow the DX/LR or PFX in a FICON write chain. In addition, the Prefix may also have an Embedded Locate Record count and an Embedded Locate Record List. These Embedded Locate Records entries allow for additional domains to be specified in a single DCW. In addition, there may be additional Locate Record Extended DCWs in the Transport Mode chain which may also have Embedded Locate Record entries.

SUMMARY

Provided are a computer program product, system, and method for packaging a pattern search request in a device command word (DCW) for transport mode processing in a channel subsystem for a storage system. Executing a pattern search request embedded in a DCW allows, for example, the storage server to do all or substantially all of the search and comparison work of a pattern search in response to as few as a single DCW from the host. As a result, in a transport mode architecture such as a zHPF compatible architecture which has been modified to provide for an embedded pattern search request in accordance with the present description, all or substantially all of the channel handshaking normally associated with known command mode processing of pattern search commands can be reduced or eliminated.

In another aspect of a pattern search request embedded in a transport mode command word in accordance with the present description, parameters for a pattern search facility operating in response to an embedded pattern search request, may be embedded, in one embodiment, in Locate Record Extended (LRE) fields of PFX/PFXR parameters of the DCW as defined by the z High Performance FICON (zHPF) protocol. For example, pattern search behavior defining flags and other parameters may be embedded in existing fields in the initial PFX/PFXR DCW of a chain of DCWs for a storage system compatible with the zHPF protocol. In this manner, compatibility with existing transport mode channel programs may be realized while leaving known DCW I/O behavior unmodified or substantially unmodified.

In one embodiment, the pattern search request packaging includes packaging in the device command word, a key search pattern indicator and argument for the pattern search request. In an alternative embodiment, the embedded key search pattern parameters may include a key pattern search argument length parameter to define the length of the key search pattern argument in embodiments having variable length key pattern search arguments. These key pattern search parameters may also be embedded, in one embodiment, in existing Locate Record Extended (LRE) fields such as in the initial PFX/PFXR DCW of a chain of DCWs for a storage system compatible with the zHPF protocol, for example, to achieve compatibility with existing transport mode channel programs.

In yet another aspect of a pattern search request embedded in a transport mode command word in accordance with the present description, device command word packaging may further include, in addition to packaging the pattern search request, packaging an embedded input/output (I/O) operation command to initiate an I/O operation and a flag indicating starting the I/O operation at a pre-count field of a record satisfying the embedded pattern search request. In one embodiment, the I/O operation command includes at least one of a read command and a write command embedded in the device command word. For example, the embedded I/O operation command may comprise at least one Channel Command Word (CCW) embedded in the DCW. The I/O CCWs may be embedded in the DCW using known techniques for I/O CCWs in a substantially unchanged manner to achieve further compatibility with existing transport mode channel programs. In other embodiments, the DCW in which the pattern search request has been embedded is in a chain of DCWs and lacks embedded I/O operation commands such as I/O CCWs in the same DCW. In one embodiment, the DCW having the embedded pattern search request is prior to any DCW of the chain having at least one of an embedded read command and an embedded write command.

In still another aspect of a pattern search request embedded in a transport mode command word in accordance with the present description, Locate Record Extended (LRE) parameters within PFX/PFXR parameters of the DCW provide a starting orientation for execution of the embedded pattern search request. Furthermore, upon successful processing of the embedded pattern search request, a starting orientation for execution of a read/write operation of an embedded CCW, is provided by the target record of the pattern search. Thus, once the requested pattern search has been successfully completed, known PFX/PFXR I/O processing initiated by the same DCW, can be initiated using the orientation provided by the successful pattern search. In this manner, efficiency of I/O processing may be improved.

In one embodiment, pattern search command packaging includes packaging a pattern search request flag in a field of the DCW whereby the flag indicates at least one of search field, search type whereby search type includes at least one of equal, equal high, and high, orientation after success, at least one of single and multiple record search, and at least one of single and multiple track search. These pattern search behavior parameters may also be embedded, in one embodiment, in existing Locate Record Extended (LRE) fields such as in the initial PFX/PFXR DCW of a chain of DCWs for a storage system compatible with the zHPF protocol, for example, to achieve compatibility with existing transport mode channel programs.

In an alternative embodiment, a separate search type DCW has an embedded pattern search request but lacks an embedded I/O command such as an embedded read command or an embedded write command. In one embodiment, the separate search type DCW is placed in the Transport Control Area (TCA) prior to the first read/write DCW. Thus, the subsequently placed read/write DCW would lack the extended pattern search behavior in this embodiment.

In yet another embodiment, the pattern search request packaging includes packaging a data pattern search indicator and data pattern search argument so that the DCW has an embedded pattern search request having both a key search pattern argument and a data pattern argument. Other pattern search behaviors may be requested depending upon the particular application. In this manner, a pattern search request embedded in a transport mode DCW may exhibit a variety of different behaviors as appropriate for the circumstances.

In another aspect of a pattern search request embedded in a transport mode command word in accordance with the present description, the DCW having the embedded pattern search request is processed by the storage system. In one embodiment, the processing by the storage system includes receiving the DCW, and performing the pattern search requested by the embedded pattern search request using the embedded key search pattern argument.

In still another aspect of a pattern search request embedded in a transport mode command word in accordance with the present description, processing by a storage system includes receiving a device command word (DCW) for DCW transport mode processing in a channel subsystem for the storage system, the DCW having a pattern search request embedded within PFX/PFXR parameters in the device command word (DCW), and a read/write Channel Command Word (CCW) embedded in the DCW. In one embodiment, the pattern search request has packaged in the device command word, an embedded key search pattern argument. The processing further includes performing a pattern search requested by the pattern search request at a starting orientation identified by Locate Record Extended (LRE) parameters within the PFX/PFXR parameters of the DCW. A read/write operation of the embedded CCW is executed at a starting orientation provided by a successful processing of the embedded pattern search request.

DETAILED DESCRIPTION

Figure 1:
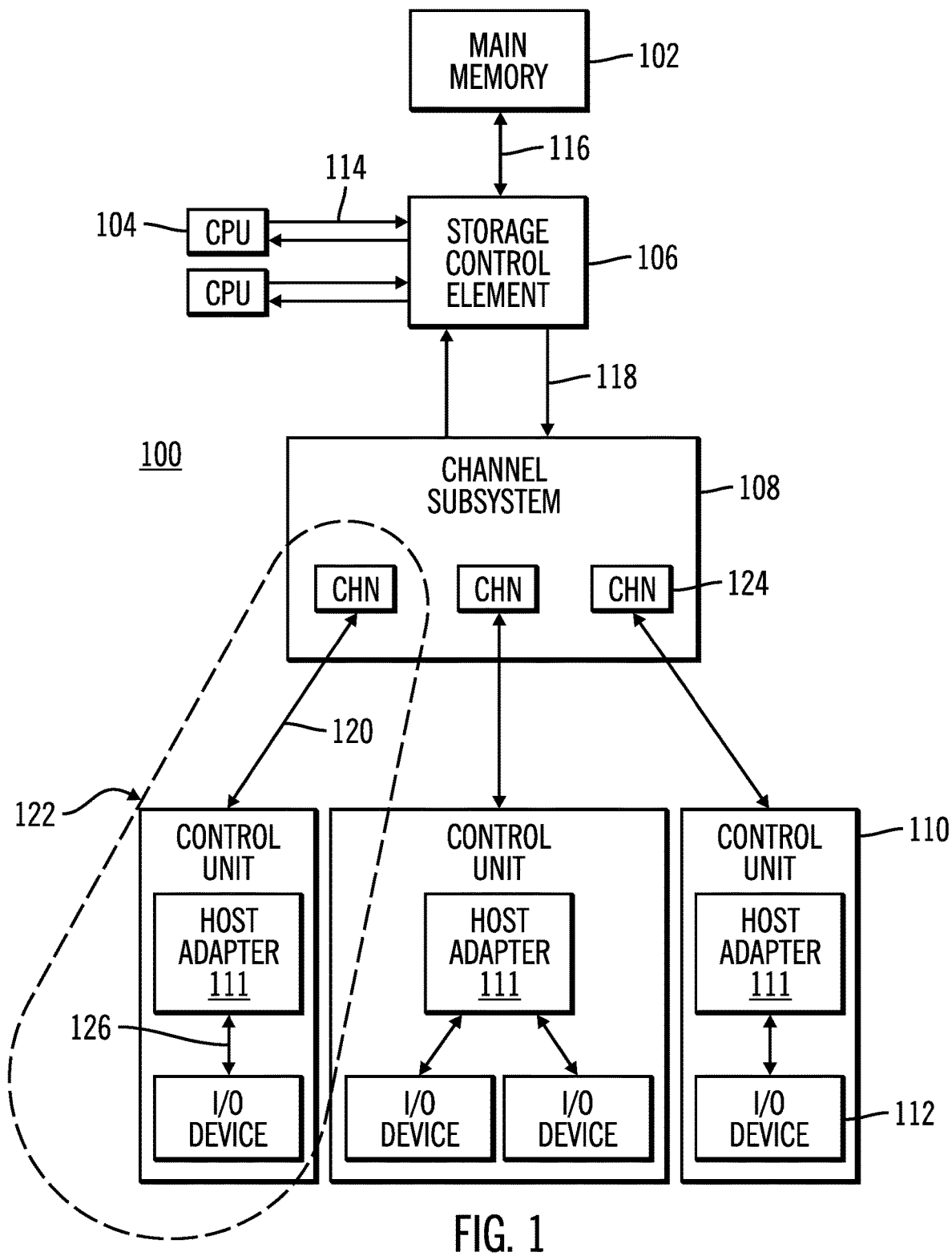
FIG. 1 illustrates an embodiment of a storage environment employing use of a pattern search request embedded in a transport mode command word for a channel subsystem of the storage environment.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A pattern search request embedded in a transport mode command word for a channel subsystem. in accordance with the present description, provides a significant improvement to computer technology. For example, a storage server processing a pattern search request embedded in a DCW, for example, allows the storage server to do all or substantially all of the search and comparison work in response to as few as a single DCW from the host. In one embodiment, the DCW having the embedded pattern search request may be the first read/write DCW, for example, of a chain of DCWs.

By comparison, in known processing of individual commands transmitted in a command mode of a channel subsystem, the tasks of repeatedly attempting to identify a record of interest are distributed amongst the host, channel subsystem and the storage server, resulting in numerous handshaking signals being transmitted back and forth as the search progresses. Such handshaking signals can occupy channel subsystem bandwidth that may otherwise have been used for I/O processing, reducing overall efficiency of the system.

In addition, I/O processing within the zHPF architecture can further be enhanced to use the target record of interest of a successful embedded pattern search request as the starting point for read/write I/O processing, all in response to as few as a single DCW. Still further orientation rules can also be relaxed such that once a target record is found, any and all fields of the record can be accessed and utilized in execution of subsequent commands of the initial or subsequent DCWs of the chain.

In one embodiment, known PFX/PFXR DCW processing in a zHPF compatible architecture, is modified to add a key pattern search option to allow for efficient pattern matching for a set of records. As noted above, in a zHPF architecture modified to provide for an embedded pattern search request, all or substantially all of the channel handshaking normally associated with known command mode processing of pattern search commands can be reduced or eliminated. Moreover, once the search has been successfully completed, known PFX/PFXR I/O processing can be initiated using the orientation provided by the successful pattern search. On the other hand, if the pattern search is unsuccessful such that a record satisfying the requested comparison of the pattern search could not be located within the requested range of the search, the DCW chain can be unit checked (e.g. terminated) with an appropriate sense.

In another aspect of a pattern search request embedded in a transport mode command word in accordance with the present description, a pattern search facility for a storage system compatible with the zHPF protocol, may be embedded, in one embodiment, in existing fields in the initial PFX/PFXR DCW of a chain of DCWs. In this manner, compatibility with existing transport mode channel programs may be realized while leaving known DCW I/O behavior unmodified or substantially unmodified. In one embodiment, the pattern search behavior of the pattern search facility is executed prior to any read or write behavior contained in the same or subsequent DCW. As a result, the orientation achieved by a successful pattern search requested in the DCW, may be utilized for the execution of read or write operations requested in the same or subsequent DCWs. In one embodiment, the starting point of the pattern search may be defined in a seek/search field in the LRE parameters and may be bound as specified by a Define Extent (DX) extent range of the DCW.

One example of a processing environment incorporating and using one or more aspects of a pattern search request embedded in a transport mode command word for a channel subsystem for a storage system in accordance with the present description, is described with reference to FIG. 1. Aspects of an embedded pattern search request in accordance with the present disclosure, as appreciated by one skilled in the art, may be embodied as a system, method, or computer product. for example. Accordingly, aspects of the present disclosure may take the form of an embodiment combining software (including firmware, resident software, micro-code, etc.) and hardware aspects all generally be referred to as a "module", "method" or "system." Furthermore, aspects of the present disclosure take the form of a computer program product embodied in one or more computer-readable medium(s) having computer-readable program code/instructions embodied thereon including controllers, micro-controllers or computer processing units.

In this example, processing environment 100 includes, for instance, a main memory 102, one or more central processing units (CPU) 104, a storage control element 106, a channel subsystem 108, one or more control units 110 such as storage servers and one or more input/output (I/O) devices 112 such as storage devices, each of which is described below. One or more components of the processing environment 100 may include logic incorporating and using one or more aspects of a pattern search request embedded in a transport mode command word for a channel subsystem for a storage system in accordance with the present description, as described with reference to FIG. 2, for example.

Main memory 102 stores data and programs, which are input from input devices 112. Main memory 102 is directly addressable and provides for high-speed processing of data by central processing units 104 and channel subsystem 108.

Central processing unit 104 is the controlling center of environment 100. It contains the sequencing and processing facilities for instruction execution, interruption action, timing functions, initial program loading, and other machine-related functions. Central processing unit 104 is coupled to storage control element 106 via a connection 114, such as a bidirectional or unidirectional bus.

Storage control element 106 is coupled to main memory 102 via a connection 116, such as a bus; to central processing units 104 via connection 114; and to channel subsystem 108 via a connection 118. Storage control element 106 controls, for example, the queuing and execution of requests made by CPU 104 and channel subsystem 108.

Channel subsystem 108 is coupled to storage control element 106, as described above, and to each of the control units via a connection 120, such as a serial link. Channel subsystem 108 directs the flow of information between input/output devices 112 and main memory 102. It relieves the central processing units of the task of communicating directly with the input/output devices and permits data processing to proceed concurrently with input/output processing. The channel subsystem uses one or more channel paths 122 as the communication links in managing the flow of information to or from input/output devices 112. As a part of the input/output processing, channel subsystem 108 also performs the path-management functions of testing for channel path availability, selecting an available channel path and initiating execution of the operation with the input/output devices.

Each channel path 122 includes a channel 124 (channels are located within the channel subsystem, in one example, as shown in FIG. 1), one or more control units 110 and one or more connections 120. In another example, it is also possible to have one or more dynamic switches as part of the channel path. A dynamic switch is coupled to a channel and a control unit and provides the capability of physically interconnecting any two links that are attached to the switch.

Also located within channel subsystem 108 are subchannels (not shown). One subchannel is provided for and dedicated to each input/output device accessible to a program through the channel subsystem. A subchannel (e.g., a data structure, such as a table) provides the logical appearance of a device to the program. Each subchannel provides information concerning the associated input/output device 112 and its attachment to channel subsystem 108. The subchannel also provides information concerning input/output operations and other functions involving the associated input/output device. The subchannel is the means by which channel subsystem 108 provides information about associated input/output devices 112 to central processing units 104, which obtain this information by executing input/output instructions.

Channel subsystem 108 is coupled to one or more control units 110. Each control unit (also referred to as a storage server) 110 provides the logic to operate and control one or more input/output devices and adapts, through the use of common facilities, the characteristics of each input/output or storage devices 112 to the link interface provided by the channel. The common facilities provide for the execution of input/output operations, indications concerning the status of the input/output device and control unit, control of the timing of data transfers over the channel path and certain levels of input/output device control.

Each control unit 110 is attached via a connection 126 (e.g., a bus) to one or more input/output devices 112. Input/output devices 112 receive information or store information in main memory 102 and/or other memory. Examples of input/output devices include card readers and punches, magnetic tape units, direct access storage devices, displays, keyboards, printers, pointing devices, teleprocessing devices, communication controllers and sensor based equipment, to name a few.

One or more of the above components of the processing environment are further described in "IBM®z/Architecture Principles of Operation," Publication No. SA22-7832-04, 5th Edition, September 2005; U.S. Pat. No. 5,461,721 entitled "System For Transferring Data Between I/O Devices And Main Or Expanded Storage Under Dynamic Control Of Independent Indirect Address Words (IDAWS)," Cormier et al., issued Oct. 24, 1995. IBM is a registered trademark of International Business Machines Corporation, Armonk, N.Y., USA. Other names used herein may be registered trademarks, trademarks or product names of International Business Machines Corporation or other companies.

Figure 2:
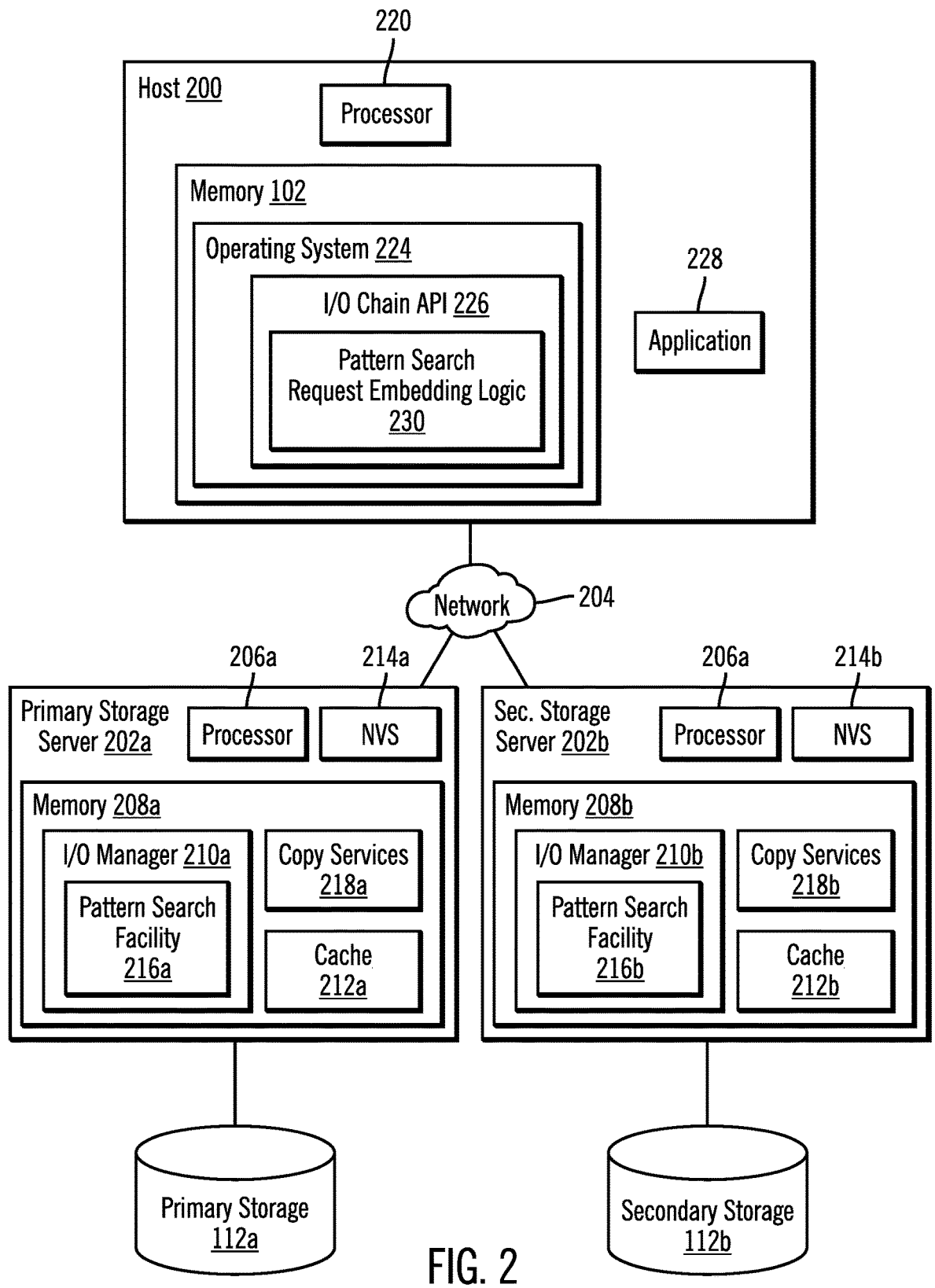
FIG. 2 illustrates another embodiment of a storage environment employing use of a pattern search request embedded in a transport mode command word for a channel subsystem of the storage environment.

FIG. 2 illustrates an embodiment of a mirror or single copy storage environment having a host 200, a primary control unit (FIG. 1) designated as a primary storage server 202a in FIG. 2, and secondary control unit designated as a storage server 202b, which communicate over a network 204. The storage servers 202a, 202b each include a processor 206a, 206b, system memory 208a, 208b, having Input/Output (I/O) managers 210a, 210b that manage write requests from the host 200, and cache 212a, 212b, as well as a non-volatile storage device (NVS) 214a, 214b.

In accordance with one aspect of a storage system employing embedded pattern search requests in accordance with the present description, the I/O managers 210a, 210b each include a pattern search facility 216a, 216b, respectively which processes pattern search requests embedded in a transport mode command word for the channel subsystem 108 (FIG. 1). Although depicted as software resident in memory 208a, 208b, logic for a pattern search facility for processing a pattern search request embedded in a device command word for a channel in a storage system, may be implemented using a variety of techniques. Thus, pattern search facility 216a, 216b may be implemented with one or more of hardware, software, and firmware, alone or in combination.

Write data in the caches 212a, 212b may be backed-up in the NVS 214a, 214b in the same server 202a, 202b, respectively. Alternatively, a cache 212a, 212b in one storage server 202a, 202b may backup writes in the NVS 214b, 214a of the other storage server 202b, 202a, respectively. An I/O device 112a (FIG. 1) designated as a primary storage 112a in FIG. 2, is coupled to the primary storage server 202a and a secondary storage 112b is coupled to the secondary storage server 202b. The I/O managers 210a, 210b manage I/O requests from the host 200 directed to data in the attached storages 112a, 112b.

The host 200 includes a processor 104 (FIG. 1), a system memory 102 (FIG. 1), and an operating system 224 which includes an I/O request chain Application Programming Interface (API) 226 to generate read/write request chains of ordered read/write requests to process I/O requests from applications 228 executing in the host 200 or other systems in the network 204 submitting I/O requests to the host 200. In one aspect of the present description, the API 226 includes logic 230 for embedding pattern search requests in device command words for a channel in a storage system.

Although depicted as software resident in memory 102, logic for the API 226 including logic for embedded pattern search requests in device command words for a channel in a storage system, may be implemented using a variety of techniques. Thus, the API 226 may be implemented with one or more of hardware, software, and firmware, alone or in combination.

In one embodiment, the storage servers 202a, 202b include copy services 218a, 218b to mirror/synchronize host 200 writes to the secondary storage sever 202b to write to the secondary storage 112b. The storage servers 202a and 202b may be comprised of an enterprise storage server suitable for managing access to attached storage devices, such as the International Business Machine Corporation's ("IBM") DS8000® storage system. (DS8000 is a registered trademark of IBM in countries throughout the world). The host 200 operating system 224 may comprise an operating system such as Z Systems Operating System (Z/OS®) from International Business Machines Corporation ("IBM") or other operating systems known in the art. (Z/OS is a registered trademark of IBM throughout the world).

The network 204 may comprise a Storage Area Network (SAN), Local Area Network (LAN), Intranet, the Internet, Wide Area Network (WAN), peer-to-peer network, wireless network, arbitrated loop network, etc. In this embodiment, the network 204 includes connectors 118 (FIG. 1) channel subsystems 108 (FIG. 1) and associated channel paths 120 (FIG. 1) and connectors 120.

The storage devices 112a, 112b may each comprise one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. The storage devices comprising the storages 112a, 112b may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Although a certain number of instances of elements, such as servers, storages, active and inactive copy relationships, etc., are shown, there may be any number of these components.

In one embodiment, the host 200 operating system 224 may include a channel subsystem, which has sub-channels that provide the information needed to access the server 202a and underlying storage 112a in which volumes are configured. The storage server 202a, 202b, I/O managers 210a, 210b may include Unit Control Blocks (UCBs) that provide a software representation of the underlying volumes, and point to the sub-channel that has the information on how to access the device including the volume addressed by the UCB.

Figure 3:
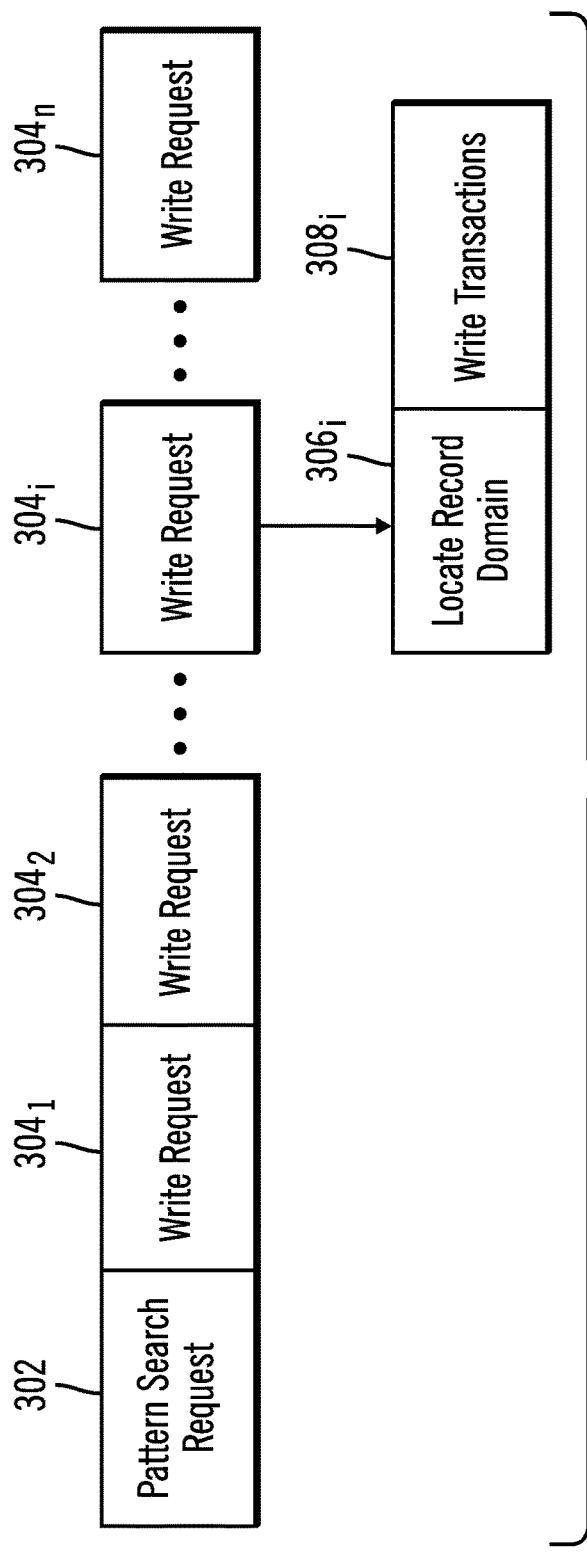
FIG. 3 illustrates an embodiment of a chain of I/O requests employing a pattern search request embedded in a transport mode command word.

FIG. 3 illustrates an embodiment of an I/O request chain 300 having an embedded pattern search request 302 in accordance with the present description. The chain 300 is produced by the I/O request chain API 226 (FIG. 2) executing in the operating system 224, or another connected host system. In this embodiment, the chain 300 includes both a pattern search request 302 and also a series of write requests $304_1$, $304_2$ ... $304_n$ that may specify to write data to discontiguous locations in the storage 112a, 112b using the orientation of a successful pattern search requested by the pattern search request 302.

The embedded pattern search request 302 adds, in one embodiment, a search Key option to provide a pattern search for a DCW. A pattern search option for a DCW represents a modification to previously known device command word processing such as PFX/PFXR DCW processing, for a transport mode channel in a zHPF architecture. An added pattern search option provides in one embodiment of the present description, efficient pattern matching for a set of records. By modifying transport mode channel processing such as that previously employed in the zHPF architecture, for example, to also perform pattern searching in accordance with the present description, channel handshaking previously associated with a search command in command mode channel processing, can be reduced or eliminated. Then once the pattern search has completed successfully in zHPF transport mode channel processing modified in accordance with the present description, known PFX/PFXR processing can then be done but using the orientation which the added pattern search provided upon successful execution of the pattern search. If the added pattern search cannot be satisfied, the chain will be unit checked (e.g. terminated) as appropriate.

In the illustrated embodiment, each write request $304_1$, $304_2$ ... $304_n$ may indicate a location in the storage 112a, 112b and an operation type wherein the identified location is storage is based upon the initial orientation provided by a successful search executed in response to the pattern search request 302. In one embodiment, each write request $304_1$, $304_2$ ... $304_n$ may comprise a write request group identifying a range of storage locations, or tracks, and a series of write transactions to the identified range, where storage locations are identified as a function of the initial orientation provided by a successful pattern search requested by the pattern search request 302.

In one implementation, each write request $304_i$ may include a locate record (LR) domain $306_i$ specifying a range or group of tracks and a plurality of write transactions $308_i$ directed to the tracks identified in the LR domain $306_i$, where the write transactions $308_i$ are ordered according to a predetermined order of the tracks to which they write, i.e., ascending order, and where the locations are specified as a function of the orientation provided by a successful execution of the pattern search request. Sequential write requests $304_1$, $304_2$ ... $304_n$ in the write request chain 300 may have write transactions to non-contiguous ranges or sections of tracks. Each locate record domain $306_i$ may specify as a function of the orientation provided by a successful execution of the pattern search request, a location comprising a track and record within the track. In addition, length of data to transfer, and operation types may be identified. In further embodiments, some or all of the write requests $304_1$, $304_2$ ... $304_n$ may comprise a single write transaction.

In one aspect of the present description, the pattern search request 302, provided for a transport mode channel such as one conforming to the zHPF protocol, can be embedded in a DCW using existing fields in device command words. For example, fields of the initial PFX/PFXR DCW of the zHPF protocol, may be utilized by the pattern search request 302 to initiate a pattern search having a specified behavior prior to any read or write behavior contained in the same DCW. In one embodiment, compatibility with existing channel programs is also achieved by utilizing preexisting I/O DCW behaviors substantially unchanged. In this manner, a mechanism is provided to perform a pattern search prior to the execution of a read or write in the same or subsequent DCW. In one embodiment, the requested pattern search starts from a starting point defined by a seek/search field in the LRE parameters and is bound by the Define Extent (DX) extent range.

In one embodiment, the I/O chain API 226 (FIG. 2) may generate write requests $304_1$, $304_2$ ... $304_n$ in a device command word (DCW), where the embedded pattern search request 302 is located within one or more prefix parameters of the DCW command word. The locate record domains $306_i$ and write transactions $308_i$ for each write request group may also be packaged in the prefix parameter or in parameters following the prefix parameters of the command word. In certain embodiments, the DCW chain may have a first locate record followed by embedded truncated locate records for operations to different locations.

In locate record embodiments, the host operating system 224 (FIG. 2) transfers the write requests $304_1$, $304_2$ ... $304_n$ or locate records to a channel subsystem in the host 200 to manage the transfer of the write requests to the storage server 202a. The channel subsystem directs the flow of read and write operations between the host 200 and storage server 202a to relieve the host operating system 224 of the task of communicating with the storage server 202a to allow the host operating system 224 to perform data processing and proceed concurrently with the Input/Output (I/O) processing being handled by the channel subsystem. The channel subsystem uses and manages channel paths as communication links from the host 200 to the storage server 202a.

In one embodiment, the I/O request chain 300 may be used with a zHPF (Transport Mode) write (and/or) chain. In further embodiments, the I/O request chain may be used with different transport and command protocols.

In FICON implementations, the write requests $304_1$, $304_2$ ... $304_n$ or locate record domains $306_i$ may be collapsed into a Prefix Command, and the locate record $306_i$ parameters describe a domain of operations that will immediately follow in the chain. In zHPF implementations, a Prefix may have an imbedded locate record list, such that the imbedded locate records $306_i$ allow for additional domains to be specified in a single DCW. In FICON and zHPF implementations, each write request $304_1$, $304_2$ ... $304_n$ including locate records domains $306_i$ specifies one or more write operations to perform at the storage locations, where the locate records may specify write operations for many discontiguous locations. Each locate record $306_i$ command specifies a location, search argument comprising a track and record within the track, length of data to transfer, and operation types. The locate records and the associated writes in the chain may be processed sequentially and all the write operations for one locate record domain must complete or be committed before the next locate record domain is processed.

As noted above, locate record operations are commonly used in conjunction with read and write system commands. For example, a write system command may be chained to a Define Extent and Locate Record commands. In this manner, when a single record is written to an I/O device, the channel subsystem creates and sends a DCW chain to the I/O device's storage server. The DCW chain includes a number of DCWs, such as Define Extent, Locate Record, and Write chained together in this order.

The Define Extent and Locate Record commands which precede the Read and Write system commands are referred to as prefix commands. The prefix commands are followed by the prefix parameters described previously.

Figure 4:
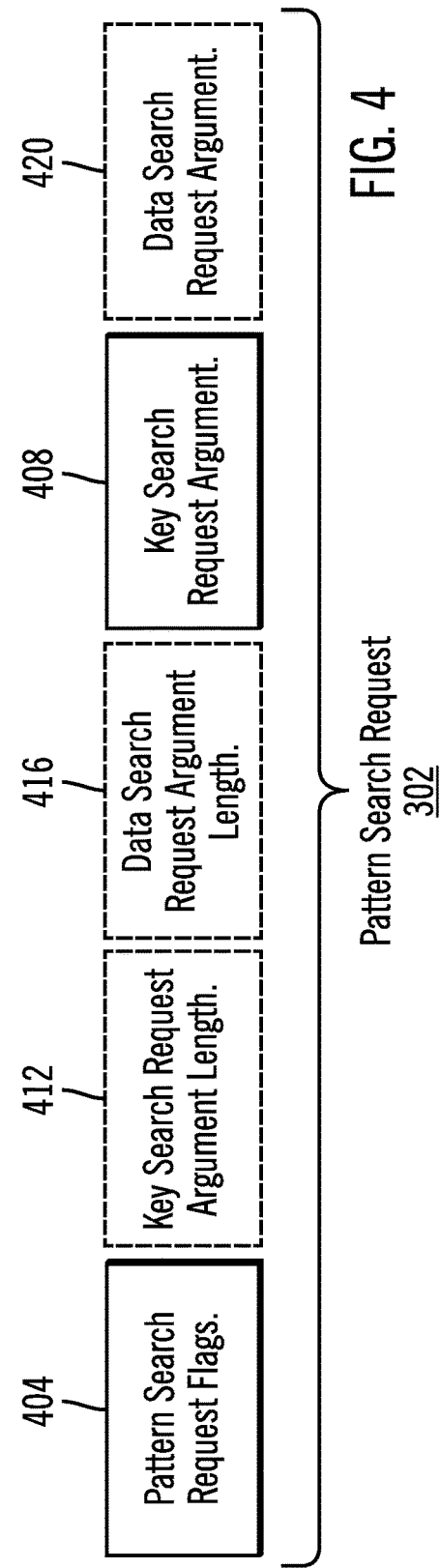
FIG. 4 illustrates an embodiment of a format for a pattern search request embedded in a transport mode command word.

FIG. 4 shows one example of a pattern search request 302 which may be embedded in a transport mode channel device command word such as a zHPF type DCW, for example. In one embodiment, the pattern search request 302 includes various fields including a field for pattern search request flags 404. In this embodiment, the pattern search request flags 404 include a pattern search facility indicator which is used to indicate to the storage server that use of the pattern search facility by the storage server is being requested by the host. In this example, a search facility indicator is represented by the state of one bit, that is, Locate Record Extended, Byte 1, Auxiliary Byte, bit 6 to indicate whether use of the search facility is requested. In the illustrated embodiment, the search facility indicator when set indicates that a key pattern search to be performed by the search facility of the storage server, has been requested by the host.

As noted above, in one aspect of an embedded pattern search request in accordance with the present description, the pattern search request 302 can use existing device command word fields such as, for example, fields of the Locate Record Extended in the initial PFX/PFXR DCW of the zHPF protocol, to initiate a pattern search behavior prior to requested read or write behaviors contained in the DCW. It is appreciated that other bits and fields may be used as a search facility indicator, depending upon the particular application. In one embodiment, a search facility indicator is preferably set only in the first DCW of a chain of DCWs so that it is not set in subsequent LRE/LRER DCWs following the initial DCW of the chain.

Figure 5:
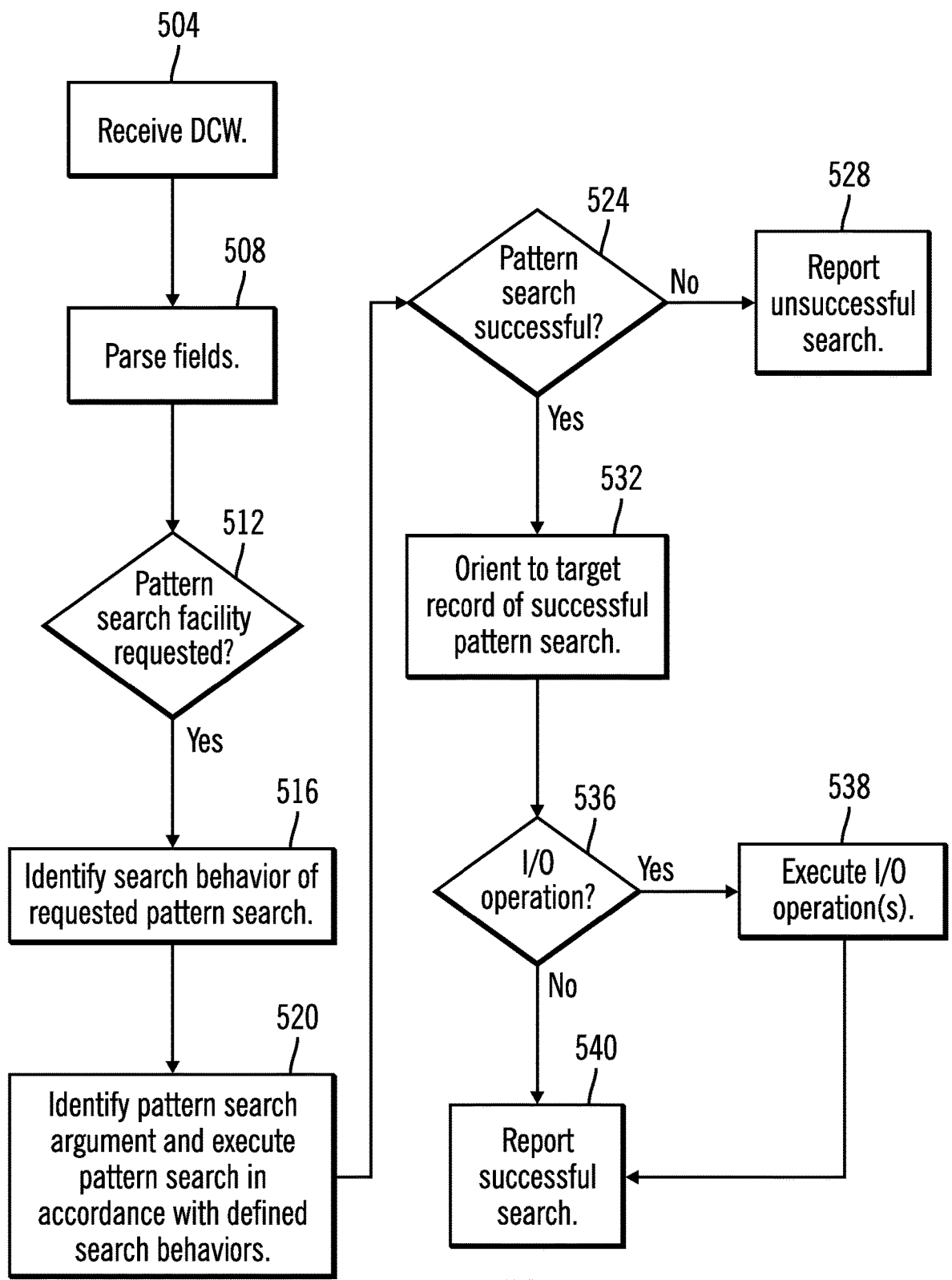
FIG. 5 illustrates an embodiment of operations to process a received transport mode command word having an embedded pattern search request.

FIG. 5 shows an example of operations of a pattern search facility 216a (FIG. 2) of the storage server 202a, which executes a pattern search in response to receipt of a pattern search request 302 (FIG. 4) issued by a host via a channel subsystem. In this embodiment, the pattern search facility 216a is configured to perform the operations of FIG. 5 including blocks 504-540 and the accompanying description of FIG. 5. However, it is appreciated that other logic of the storage server 202a the may be configured to perform the operations, depending upon the particular application.

As explained in greater detail below, in accordance with one aspect of the present description, the search facility 216a in executing the requested search request 302, allows the storage server 202a to do all of the search and comparison work of a pattern search within as few as a single request relayed by the channel subsystem from the host as part of the first DCW which may be a read/write DCW from the channel. In addition, the zHPF architecture can further be optimized to use the record of interest, that is the target record, of a successful requested pattern search to be the starting point (orientation) for read and/or write operations which may all be within a single DCW, for example. By comparison, in prior known storage systems, such search and comparison work of repeatedly trying to identify a record of interest in a pattern search was performed in a series of individual CCW commands from the host to the storage server via a channel subsystem operating in a command mode, typically requiring numerous handshake signals between the storage server and the host to accomplish the pattern search.

In response to receipt (block 504, FIG. 5) of a device command word (DCW) from a host 200 (FIG. 2) over a channel path 120 (FIG. 1) operating in the transport mode, the pattern search facility 216a (FIG. 2) of the primary storage server 202a (FIG. 2) parses (block 508) fields of the received DCW including the flag fields 404 (FIG. 4) to determine (block 512, FIG. 5) whether the pattern search facility indicator has been set in the flag fields 404 of the received DCW. In one embodiment, the pattern search request 302 (FIG. 4) is embedded in PFX/PFXR parameters of the received DCW. In response to the search facility indicator being determined to be set, the pattern search facility 216a identifies (block 516, FIG. 5) from the pattern search request 302, the particular pattern search behavior which has been requested for the requested pattern search. In one embodiment, the pattern search request 302 includes the first two bytes of the extended parameter portion of the LRE parameters as additional flags of the flags 404 (FIG. 4) to define a particular search behavior. For example, these additional flags may include indications for search field and type (that is, equal, equal high, high, for example), orientation after success, single or multiple record search, and single or multiple track search. Thus, known pattern search behaviors from prior CCW strings may be adapted to a DCW modified to have an embedded pattern search request in accordance with the present description. It is appreciated that various other search fields, types and search behaviors may be defined using flags or other indicators, depending upon the particular application.

In the illustrated embodiment, the search argument 408 (FIG. 4) for the key pattern search is positioned in one of the fields following the two bytes of the flags 404 of the pattern search request 302. Accordingly, in this embodiment, the length of the extent parameter spans at least the 2 bytes for the flags 404 and then also the length of the key pattern search request argument 408.

It is appreciated that other fields and formats may be used for a pattern search request embedded in a device command word for a transport mode channel, depending upon the particular application. For example, the pattern search request 302 may optionally include other pattern search indicators and fields for other pattern search arguments such as fields for count area pattern searches or data pattern searches as explained below.

If the search facility indicator is set for a key pattern search, for example, the search facility 216a of the storage server 202a identifies (block 520, FIG. 5) the appropriate pattern search argument such as the key pattern search argument 408 discussed above, and executes (block 520, FIG. 5) a pattern search as indicated by the search behavior flags 404 and the identified search argument or arguments. In the illustrated embodiment, the search facility 216a of the storage server 202a uses LRE parameters in the PFX/PFXR command of the DCW to initially determine the CKD record which is the starting point, that is an initial or starting orientation for processing the requested pattern search. Starting at the CKD record which is designated the search start point, the search facility executes (block 520, FIG. 5) the requested pattern search, that is, attempts to find the record of interest based on the search argument(s) and flag information provided by the pattern search request 302. In one embodiment, the search facility 216a of the storage server 202a processes the pattern search request 302 before executing any I/O operation embedded in the same DCW. Instead, as explained below, if the requested pattern search is successful in finding a target record which satisfies the requested pattern search, a field such as a pre-count field of the target record is used as a starting orientation or starting CKD record for the reading or writing of data to the storage or cache.

In one embodiment, if the search facility 216a is oriented to a count area of a CKD record, the pattern search operates on the key area of the same record; otherwise, the search facility 216a orients to the count area of the next user data record on the track and operates on the key area of that record to attempt to find key bytes matching the pattern search key argument provided with the pattern search request 302. If End-of-Track is detected before a count area is found, the search facility 216a attempts to advance to the next track and continues searching with the defined search extent as described above until a count area (other than Record Zero) is found, or until the operation is terminated with an End-of-Cylinder exception.

In known CKD records, the length of the key area (KL) is defined in the key length field of the count area. If KL is zero, the pattern search in one embodiment is deemed (block 524, FIG. 5) to be unsuccessful, and the pattern key search by the search facility 216a goes no further in one embodiment. An unsuccessful pattern key search requested by the DCW ends with appropriate status information being reported (block 528, FIG. 5) to the requesting host. For example, in one embodiment, status information such as CE/DE/UC with Status Not as Required is reported. In a FICON embodiment, the storage is oriented to the data field of the record with a KL of zero and a status of "CE/DE" is reported. It is appreciated that other status information may be provided, depending upon the particular application.

If the length of the pattern key search argument of the request 302 is less than the KL of the record being examined, the pattern key search argument 408 is compared with an equal number of bytes from the key area being examined. If the KL of that record is less than the length of the pattern key search argument, the key field of that record is compared with an equal number of bytes from the pattern key search argument.

In one embodiment, pattern search request 302 provided by a host may request a pattern search on one or more of a count field (ID), key field or data field. In performing the search, the search Facility 216a of the storage server transfers a search argument from the request 302, reads a corresponding count, key or data field from the storage device or cache and performs a logical compare operation of the argument and the read field. The request 302 provided by the host via a channel subsystem may request that the read field and the argument match or that the read field has a greater value than the argument, for example. Other search behaviors may be specified by the pattern search request 302 to govern the behavior of the requested search.

The requested pattern search continues in this manner, on a record by record basis until either a record having the requested pattern is successfully located, or until the search terminates, having reached the end of the designated search extent. In one aspect of a pattern search request embedded in a DCW in accordance with the present description, handshaking signals between the host and storage server are significantly reduced or eliminated as the record by record pattern search proceeds.

If the requested pattern search fails (block 524) to locate a read field which satisfies the requested comparison within the designated search extent area, the search facility 216a returns (block 528, FIG. 5) status information which indicates failure of the storage server to find the record that satisfies the requested compare. On the other hand, following a successful execution of a pattern search by the search facility 216a of the storage server 202a, the I/O Manager 210a of the storage server 202a is oriented (block 532, FIG. 5) to the record with the read field that satisfied the compare requirements. The search behavior flags 404 of the search request 302 are used by the search facility 216a to determine if the I/O Manager 210a is oriented to the beginning of the record (Pre-Count/HA) or after the key field (Key) in one embodiment.

In one aspect of a pattern search request embedded in a DCW in accordance with the present description, additional CCWs may also be embedded in the same or subsequent DCWs, such as read or write CCWs. Thus, once the target record is located resulting in an orientation determined by that target record, if the DCW is determined (block 536, FIG. 5) to also contain I/O operations such as embedded read or write CCWs, the embedded read/write CCW(s) in the LRE parameters may be executed (block 538, FIG. 5) for reading or writing starting at the data field associated with the orientation point of the target record. Successful completion of the requested pattern search, orientation at the matching record and execution of the requested I/O(s) starting from that orientation, may be reported (block 540, FIG. 5) to the requesting host. If the DCW in which the pattern search request 302 is embedded lacks read or write CCWs, successful completion of the requested pattern search, and orientation at the matching record, may similarly be reported (block 540, FIG. 5) to the requesting host.

Figure 6:
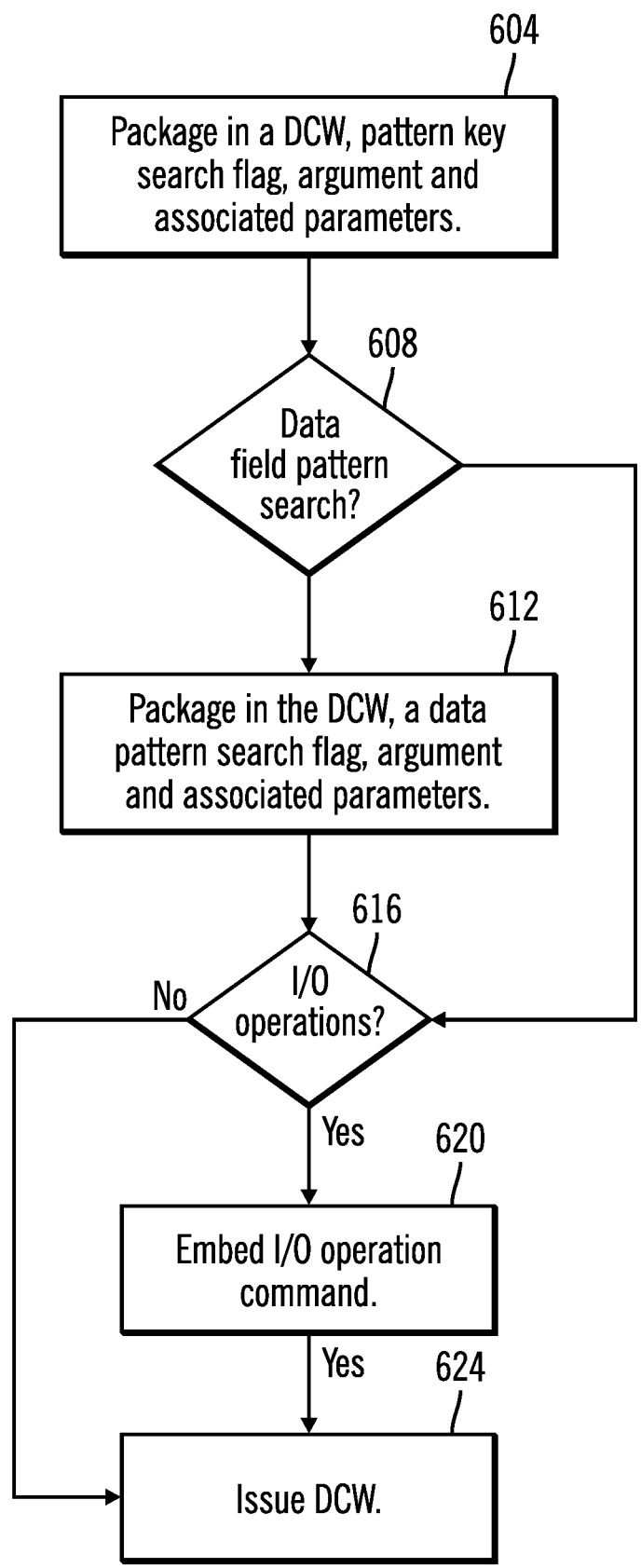
FIG. 6 illustrates an embodiment of operations to package a transport mode command word to have an embedded pattern search request.

FIG. 6 shows an example of operations of pattern search request embedding logic 230 (FIG. 2) of the host 200 which packages a pattern search request 302 (FIG. 4) in a DCW for transmission to a storage server via a channel subsystem operating in a transport mode. In this embodiment, the pattern search request embedding logic 230 is configured to perform the operations of FIG. 6 including blocks 604-624 and the accompanying description of FIG. 6. However, it is appreciated that other logic of the host 200 or channel subsystem may be configured to perform the operations, depending upon the particular application.

In this example, the pattern search request embedding logic 230 packages in a DCW for transmission to the storage server via a channel subsystem operating in a transport mode, a pattern search key flag such as a pattern search facility indicator as described above, to indicate to the storage server that use of the pattern search facility by the storage server is being requested by the host. In this example, the search facility indicator is represented by the state of one bit, that is, Locate Record Extended, Byte 1, Auxiliary Byte, bit 6 as noted above, to indicate whether use of the search facility is requested. In the illustrated embodiment, the search facility indicator of bit 6 when set indicates that a key pattern search to be performed by the search facility of the storage server, has been requested by the host.

Packaged (block 604, FIG. 6) with the pattern search indicator for a pattern key search is a search argument 408 (FIG. 4) for the key pattern search. In one embodiment, the search argument 408 is positioned in one of the fields following the two bytes of the flags 404 of the pattern search request 302. Accordingly, in this embodiment, the length of the extent parameter spans at least the 2 bytes for the flags 404 and then also the length of the key pattern search request argument 408 as described above.

In one embodiment, the key search argument 408 may have a fixed length within the pattern search request 302. In other embodiments, the length of the key search argument 408 may vary. In such embodiments, the pattern search request 302 may optionally include a field within the extended parameters which defines the length of the key search request argument 408 as indicated by the field of the key search request argument length 412 depicted in FIG. 4.

For example, 2 bytes of search facility flags 404 (FIG. 4) may be followed by 1 byte of key search request argument length 412 and also followed by the key search request argument 408 itself. The lay out of such an embodiment is as follows: Extended Parameter Length has a length equal to:

2 bytes (flags)+1 byte (defining key search argument length)+length (in bytes) of key search argument itself
Extended Parameters of one example may be as follows:
Flags (2 bytes):
Search Equal
Single Record
Key Search Indicator
Key Search Argument Length 0x04
Key Search Argument 0x00000000
such that the Extended Parameter Length of this example has a length of 7 bytes. It is appreciated that other lengths, formats and fields may be used, depending upon the particular application.

In another aspect of a storage system employing a pattern search request embedded in a device command word of a channel subsystem operating in a transport mode, the architecture of the embedded pattern search request may be further expanded to provide for a pattern search not only of the key field but other fields as well such as a pattern search of the data field of a CKD formatted record, for example.

Accordingly, the pattern search request embedding logic 230 (FIG. 2) determines (block 608, FIG. 6) whether to embed an optional pattern search request directed to data fields. If so, the pattern search request embedding logic 230 (FIG. 2) packages (block 612, FIG. 6) in the in the flags 404 of the DCW, a pattern search indicator for a pattern data search. Also packaged in the pattern search request 302 in this example, is a data search request argument length parameter 416 and data search request argument 420 (FIG. 4) for the data pattern search. In one embodiment, the data search argument length parameter 416 and the data search request argument 420 are positioned in one or more of the fields following the two bytes of the flags 404 of the pattern search request 302. Accordingly, in this embodiment, the length of the extent parameter spans at least the 2 bytes for the flags 404 and also extends the lengths of the key pattern search parameters 412, 408 and the data pattern search parameters 416 and 420.

The lay out for one example of such an embodiment may be as follows: Extended Parameter Length has a length equal to:

2 bytes (flags)+1 byte (defining key search argument length)+1 byte (defining data search argument length)+ length (in bytes) of key search argument itself+length (in bytes) of data search argument itself
Extended Parameters of this example may be as follows:
Flags (2 bytes):
Search Equal
Single Record
Key Search Indicator
Data Search Indicator
Key Search Argument Length 0x04
Data Search Argument Length 0x04
Key Search Argument 0x00000000
Data Search Argument 0x00000000
such that the Extended Parameter Length of this example has a length of 12 bytes. This embodiment facilitates different sizes for the arguments of the various key and data pattern searches. In embodiments in which only the key field is to be pattern searched, the data search argument parameters may be excluded from the Extended Parameters. It is appreciated that other lengths, formats and fields may be used, depending upon the particular application.

In another aspect of an embedded pattern search request in accordance with the present description, the pattern search request embedding logic 230 optionally packages in the same (or subsequent DCW) for transmission to the storage server via a channel subsystem operating in a transport mode, one or more I/O requests to be executed upon a successful conclusion of the requested pattern search. Accordingly, in this embodiment, the pattern search request embedding logic 230 determines (block 616, FIG. 6) whether I/O operations are to be packaged in the same DCW containing the embedded pattern search request 302, or in a subsequent DCW of the chain of DCWs employing an embedded pattern search request 302. If so, the pattern search request embedding logic 230 embeds (block 620, FIG. 6) one or more I/O commands or requests in the form of CCWs as described above in connection with FIG. 3.

Alternatively, if the pattern search request embedding logic 230 determines (block 616, FIG. 6) that I/O operations are not to be packaged in the same DCW containing the embedded pattern search request 302, the pattern search request embedding logic 230 bypasses embedding (block 620, FIG. 6) one or more I/O commands or requests in the form of CCWs as described above in connection with FIG. 3. In known architectures directed to DCWs, it is a requirement that the DCW contain an I/O command type CCW. However, in this alternative embodiment of the present disclosure, a separate search type DCW can be implemented which has an embedded pattern search request but lacks an embedded I/O command such as an embedded CCW read command or an embedded CCW write command. In one embodiment, the separate search type DCW of a chain of DCWs is placed in the Transport Control Area (TCA) prior to the first read/write DCW of the chain. Thus, the subsequently placed read/write DCWs of the chain would lack the extended pattern search behavior in this embodiment.

Upon completion of the packaging operation, the host issues (block 624, FIG. 6) the completed DCW or chain of DCWs to the storage server controlling the target storage device via a channel subsystem coupling the host to the storage server. In response, the storage server performs the requested pattern search or searches and initiates the requested I/O operations (if any) starting at the orientation associated with the target record if the search was successful as discussed above.

It is seen from the above that a storage server processing a pattern search request embedded in a DCW, for example, provides the storage server of the capability to do all or substantially all of the search and comparison work of a pattern search in response to as few as a single DCW from the host. In addition, the numerous handshaking signals associated with known processing of individual commands transmitted in a command mode of a channel subsystem, can be largely reduced or eliminated. Such a pattern search request may be embedded in a DCW using existing fields of the DCW to facilitate compatibility with known protocols. Still further, I/O processing within the zHPF architecture can be enhanced to use the target record of interest of a successful embedded pattern search request as the starting point for read/write I/O processing, all in response to as few as a single DCW. Moreover, orientation rules can also be relaxed such that once a target record is found, any and all fields of the record can be accessed and utilized in execution of subsequent commands of the initial or subsequent DCWs of the chain.

Provided are examples of implementations of pattern search requests embedded in a transport mode device command word.

Example 1 is a computer program product for processing requests to a storage system, wherein the computer program product comprises a computer readable storage medium having program instructions embodied therewith, the program instructions executable by a processor to cause operations, the operations comprising packaging a pattern search request in a device command word (DCW) for DCW transport mode processing in a channel subsystem for the storage system, the pattern search request packaging including packaging in the device command word, a key search pattern argument for the pattern search request so that the DCW has an embedded pattern search request having a key search pattern argument.

In Example, 2, the subject matter of examples 1 and 3-8 can optionally include packaging in addition to the pattern search request, an embedded input/output (I/O) operation command to initiate an I/O operation, and a flag indicating starting the I/O operation at a pre-count field of a record satisfying the embedded pattern search request, and wherein the I/O operation command includes at least one of a read command and a write command embedded in the device command word.

In Example 3, the subject matter of examples 1-2 and 4-8 can optionally include that the pattern search request is embedded within PFX/PFXR parameters of the DCW, and wherein the operations further comprise packaging in addition to the pattern search request, a read/write Channel Command Word (CCW) embedded in the DCW and wherein Locate Record Extended (LRE) parameters within PFX/PFXR parameters of the DCW provide a starting orientation for execution of the embedded pattern search request and a successful processing of the embedded pattern search request provides a starting orientation for execution of a read/write operation of the embedded CCW.

In Example 4, the subject matter of examples 1-3 and 5-8 can optionally include that wherein the pattern search request packaging includes packaging the pattern search request and key search pattern argument in Locate Record Extended (LRE) fields of the DCW as defined by the z High Performance FICON (zHPF) protocol.

In Example 5, the subject matter of examples 1-4 and 6-8 can optionally include that wherein the pattern search request packaging includes packaging a pattern search request flag in a field of the DCW wherein the flag indicates at least one of search field and search type wherein search type includes at least one of equal, equal high, and high, and wherein the flag further indicates orientation after success, at least one of single and multiple record search, and at least one of single and multiple track search.

In Example 6, the subject matter of examples 1-5 and 7-8 can optionally include that wherein the DCW having an embedded pattern search request is in a chain of DCWs and lacks an embedded read command and lacks an embedded write command so that the DCW having the embedded pattern search request is prior to any DCW of the chain having at least one of an embedded read command and an embedded write command.

In Example 7, the subject matter of examples 1-6 and 8 can optionally include that wherein the pattern search request packaging includes packaging a data search pattern argument for the pattern search request so that the DCW has an embedded pattern search request having both a key pattern search argument and a data pattern search argument.

In Example 8, the subject matter of examples 1-7 can optionally include that wherein the pattern search request is embedded in fields in an initial PFX/PFXR type DCW of a chain of DCWs.

In Example 9, the subject matter of examples 1-8 can optionally include processing the DCW by a storage system including receiving the DCW, and performing the pattern search requested by the embedded pattern search request using the embedded key search pattern argument.

Example 10 is a computer program product for processing requests in a storage system, wherein the computer program product comprises a computer readable storage medium having program instructions embodied therewith, the program instructions executable by a processor to cause operations, the operations comprising receiving a device command word (DCW) for DCW transport mode processing in a channel subsystem for the storage system, the DCW having a pattern search request embedded within PFX/PFXR parameters in the device command word (DCW), and a read/write Channel Command Word (CCW) embedded in the DCW, the pattern search request having packaged in the device command word, an embedded key search pattern argument; performing a pattern search requested by the pattern search request at a starting orientation identified by Locate Record Extended (LRE) parameters within the PFX/PFXR parameters of the DCW; and executing a read/write operation of the embedded CCW at a starting orientation provided by a successful processing of the embedded pattern search request.

Example 11 comprises a system including a processor that executes program instructions in a computer readable storage medium to perform the operations as described in Examples 1 through 10.

Example 12 comprises a method to perform operations as described in Examples 1 through 10.

The reference characters used herein, such as i, k, m, and n, are used herein to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
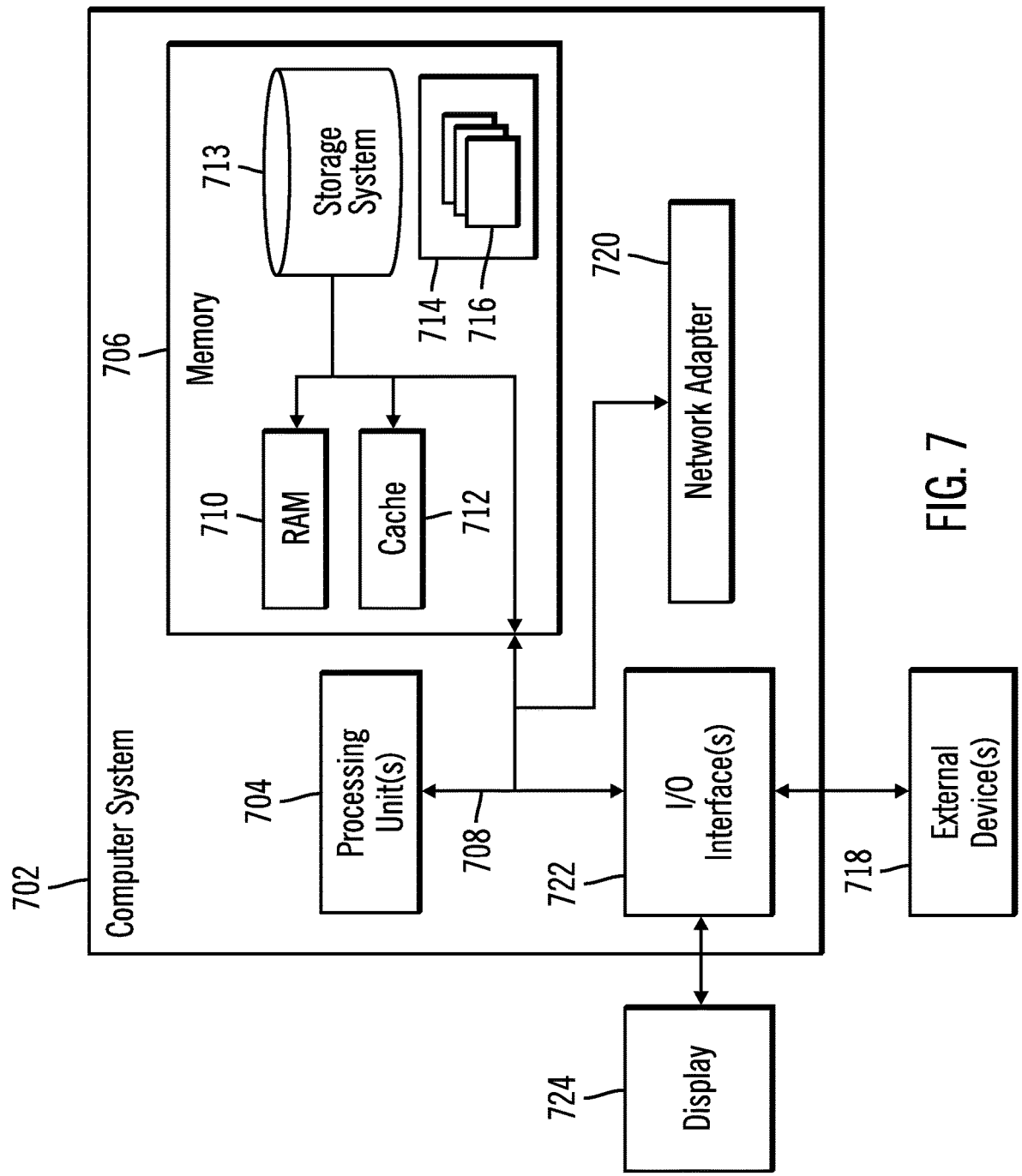
FIG. 7 illustrates an embodiment of a computer environment employing use of a pattern search request embedded in a transport mode command word for a channel subsystem of the computer environment.

The computational components of FIGS. 1 and 2, including the CPU 104, storage control element 106, channel subsystem 108, control unit 110, host 200 and storage servers 202*a*, 202*b* may be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 724, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 720. As depicted, network adapter 720 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for processing requests to a storage system, wherein the computer program product comprises a computer readable storage medium having program instructions embodied therewith, the program instructions executable by a processor to cause operations, the operations comprising
    a host computer generating at least one device command word (DCW) for DCW transport mode processing in a channel subsystem for a storage system, the DCW generating including packaging a pattern search request in the device wherein the pattern search request packaging includes packaging in the device command word, a key pattern search argument identifying for the pattern search request, a key field search pattern to be searched for within a key field of a record, so that the generated DCW has the embedded pattern search request having the key pattern search argument; and
    the host computer requesting a pattern search for the key field search pattern including transmitting in the channel subsystem for the storage system, the generated DCW having the pattern search request and key pattern search argument for the pattern search request, packaged in the DCW to request a pattern search for the key field search pattern.

2. The computer program product of claim 1 wherein the DCW generating further includes packaging in addition to the pattern search request, an embedded input/output (I/O) operation command to initiate an I/O operation, and a flag indicating starting the I/O operation at a pre-count field of a record satisfying the embedded pattern search request, and wherein the I/O operation command includes at least one of a read command and a write command embedded in the device command word.

3. The computer program product of claim 1 wherein the pattern search request is embedded within prefix parameters of the DCW, and wherein the DCW generating further includes packaging in addition to the pattern search request, a read/write Channel Command Word (CCW) embedded in the DCW and wherein Locate Record Extended (LRE) parameters within prefix parameters of the DCW provide a starting orientation for execution of the embedded pattern search request within a key field of a record and a successful processing of the embedded pattern search request provides a starting orientation for execution of a read/write operation of the embedded CCW.

4. The computer program product of claim 1 wherein the pattern search request packaging includes packaging the pattern search request and key pattern search argument in Locate Record Extended (LRE) fields of the DCW as defined by the z High Performance FICON (zHPF) protocol.

5. The computer program product of claim 1 wherein the pattern search request packaging includes packaging a pattern search request flag in a field of the DCW wherein the flag indicates at least one of search field and search type wherein search type includes at least one of equal, equal high, and high, and wherein the flag further indicates orientation after success, at least one of single and multiple record search, and at least one of single and multiple track search.

6. The computer program product of claim 1 wherein the DCW having an embedded pattern search request is in a chain of DCWs and lacks an embedded read command and lacks an embedded write command so that the DCW having the embedded pattern search request is prior to any DCW of the chain having at least one of an embedded read command and an embedded write command.

7. The computer program product of claim 1 wherein the pattern search request packaging includes packaging a data pattern search argument identifying for the pattern search request, a data search pattern to be searched for within a data field of a record, so that the DCW has an embedded pattern search request having both a key pattern search argument and a data pattern search argument.

8. The computer program product of claim 1 wherein the pattern search request is embedded in fields in an initial PFX type DCW of a chain of DCWs.

9. A computer system, comprising:
    a storage system;
    a host;
    a channel subsystem coupling the host and storage system;
    a processor of at least one component of the computer system; and
    a computer program product for processing requests to the storage system, wherein the computer program product comprises a computer readable storage medium having program instructions embodied therewith, the program instructions executable by a processor to cause operations, the operations comprising the host generating at least one device command word (DCW) for DCW transport mode processing in a channel subsystem for the storage system, the DCW generating including packaging a pattern search request in the DCW wherein the pattern search request packaging includes packaging in the device command word, a key pattern search argument identifying for the pattern search request, a key field search pattern to be searched for within a key field of a record, so that the generated DCW has the embedded pattern search request having the key pattern search argument; and the host requesting a pattern search for the key field search pattern including transmitting in the channel subsystem for the storage system, the generated DCW having the pattern search request and key pattern search argument for the pattern search request, packaged in the DCW to request a pattern search for the key field search pattern.

10. The computer system of claim 9 wherein the DCW generating further includes packaging in addition to the pattern search request, an embedded input/output (I/O) operation command to initiate an I/O operation, and a flag indicating starting the I/O operation at a pre-count field of a record satisfying the embedded pattern search request, and wherein the I/O operation command includes at least one of a read command and a write command embedded in the device command word.

11. The computer system of claim 9 wherein the pattern search request is embedded within prefix parameters of the DCW, and wherein the DCW generating further includes packaging in addition to the pattern search request, a read/write Channel Command Word (CCW) embedded in the DCW and wherein Locate Record Extended (LRE) parameters within prefix parameters of the DCW provide a starting orientation for execution of the embedded pattern search request within a key field of a record and a successful processing of the embedded pattern search request provides a starting orientation for execution of a read/write operation of the embedded CCW.

12. The computer system of claim 9 wherein the pattern search request packaging includes packaging the pattern search request and key pattern search argument in Locate Record Extended (LRE) fields of the DCW as defined by the z High Performance FICON (zHPF) protocol.

13. The computer system of claim 9 wherein the pattern search request packaging includes packaging a pattern search request flag in a field of the DCW wherein the flag indicates at least one of search field and search type wherein search type includes at least one of equal, equal high, and high, and wherein the flag further indicates orientation after success, at least one of single and multiple record search, and at least one of single and multiple track search.

14. The computer system of claim 9 wherein the DCW having an embedded pattern search request is in a chain of DCWs and lacks an embedded read command and lacks an embedded write command so that the DCW having the embedded pattern search request is prior to any DCW of the chain having at least one of an embedded read command and an embedded write command.

15. The computer system of claim 9 wherein the pattern search request packaging includes packaging a data pattern search argument identifying for the pattern search request, a data search pattern to be searched for within a data field of a record, so that the DCW has an embedded pattern search request having both a key pattern search argument and a data pattern search argument.

16. The computer system of claim 9 wherein the pattern search request is embedded in fields in an initial PFX type DCW of a chain of DCWs.

17. A computer-implemented method, comprising:

a host computer generating at least one device command word (DCW) for DCW transport mode processing in a channel subsystem for a storage system, the DCW generating including packaging a pattern search request in the DCW wherein the pattern search request packaging includes packaging in the device command word, a key pattern search argument identifying for the pattern search request, a key field search pattern to be searched for within a key field of a record, so that the generated DCW has the embedded pattern search request having the key pattern search argument; and the host computer requesting a pattern search for the key field search pattern including transmitting in the channel subsystem for the storage system, the generated DCW having the pattern search request and key pattern search argument for the pattern search request, packaged in the DCW to request a pattern search for the key field search pattern.

18. The method of claim 17 wherein the DCW generating further includes packaging in addition to the pattern search request, an embedded input/output (I/O) operation command to initiate an I/O operation, and a flag indicating starting the I/O operation at a pre-count field of a record satisfying the embedded pattern search request, and wherein the I/O operation command includes at least one of a read command and a write command embedded in the device command word.

19. The method of claim 17 wherein the pattern search request is embedded within prefix parameters of the DCW, and wherein the DCW generating further includes packaging in addition to the pattern search request, a read/write Channel Command Word (CCW) embedded in the DCW and wherein Locate Record Extended (LRE) parameters within prefix parameters of the DCW provide a starting orientation for execution of the embedded pattern search request within a key field of a record and a successful processing of the embedded pattern search request provides a starting orientation for execution of a read/write operation of the embedded CCW.

20. The method of claim 17 wherein the pattern search request packaging includes packaging the pattern search request and key pattern search argument in Locate Record Extended (LRE) fields of the DCW as defined by the z High Performance FICON (zHPF) protocol.

21. The method of claim 17 wherein the pattern search request packaging includes packaging a pattern search request flag in a field of the DCW wherein the flag indicates at least one of search field and search type wherein search type includes at least one of equal, equal high, and high, and wherein the flag further indicates orientation after success, at least one of single and multiple record search, and at least one of single and multiple track search.

22. The method of claim 17 wherein the DCW having an embedded pattern search request is in a chain of DCWs and lacks an embedded read command and lacks an embedded write command so that the DCW having the embedded pattern search request is prior to any DCW of the chain having at least one of an embedded read command and an embedded write command.

23. The method of claim 17 wherein the pattern search request packaging includes packaging a data pattern search argument identifying for the pattern search request, a data search pattern to be searched for within a data field of a record, so that the DCW has an embedded pattern search request having both a key pattern search argument and a data pattern search argument.

24. The method of claim 17 wherein the pattern search request is embedded in fields in an initial PFX type DCW of a chain of DCWs.

25. A computer program product for processing requests in a storage system, wherein the computer program product comprises a computer readable storage medium having program instructions embodied therewith, the program instructions executable by a processor to cause operations, the operations comprising receiving a device command word (DCW) for DCW transport mode processing in a channel subsystem for the storage system, the DCW having a pattern search request embedded within prefix parameters in the device command word (DCW), and a read/write Channel Command Word (CCW) embedded in the DCW, the pattern search request having packaged in the device command word, an embedded key pattern search argument identifying a key search pattern to be searched for within a key field of a record;

performing a pattern search requested by the pattern search request, within a key field of a record, at a starting orientation identified by Locate Record Extended (LRE) parameters within the prefix parameters of the DCW; and executing a read/write operation of the embedded CCW at a starting orientation provided by a successful processing of the embedded pattern search request.

* * * * *